United States Patent
Lee et al.

(10) Patent No.: US 10,081,141 B2
(45) Date of Patent: Sep. 25, 2018

(54) POLARIZING PLATE HAVING LOCAL DEPOLARIZATION AREA AND METHOD FOR MANUFACTURING SAME

(71) Applicant: LG CHEM, LTD., Seoul (KR)

(72) Inventors: Byung Sun Lee, Daejeon (KR); Sung Hyun Nam, Daejeon (KR); Kyun Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/911,216

(22) PCT Filed: Sep. 26, 2014

(86) PCT No.: PCT/KR2014/009053
§ 371 (c)(1),
(2) Date: Feb. 9, 2016

(87) PCT Pub. No.: WO2015/046969
PCT Pub. Date: Apr. 2, 2015

(65) Prior Publication Data
US 2016/0195767 A1    Jul. 7, 2016

(30) Foreign Application Priority Data

Sep. 30, 2013 (KR) .................. 10-2013-0117011
Sep. 23, 2014 (KR) .................. 10-2014-0126249

(51) Int. Cl.
*G02B 5/30* (2006.01)
*G02F 1/1335* (2006.01)
(Continued)

(52) U.S. Cl.
CPC ............ *B29C 71/04* (2013.01); *G02B 5/3033* (2013.01); *B29C 2035/0827* (2013.01);
(Continued)

(58) Field of Classification Search
CPC ............ G02F 1/1335; G02F 1/133533; G02F 1/133536; G02B 5/30; G02B 5/3058;
(Continued)

(56) References Cited

U.S. PATENT DOCUMENTS 5,284,364 A * 2/1994 Jain .................... G06K 1/12
                                                283/87
6,606,136 B2 * 8/2003 Matsumoto .......... G02B 5/3033
                                                264/1.35
(Continued)

FOREIGN PATENT DOCUMENTS

EP      2447766 A1    5/2012
EP      2518533 A1    10/2012
(Continued)

*Primary Examiner* — Jie Lei
(74) *Attorney, Agent, or Firm* — Dentons US LLP (57) ABSTRACT

The present invention relates to a polarizing plate that comprises a polyvinyl alcohol-based polarizer dyed with any one or more of iodine and a dichroic dye and that locally has a depolarized region having a single transmittance of 70% or more at a wavelength ranging from 400 nm to 800 nm, the depolarized region being formed by irradiating light having a specific wavelength selected from a wavelength range of 200 nm to 800 nm, and to a manufacturing method thereof.

5 Claims, 7 Drawing Sheets

(51) Int. Cl.
*B29C 71/04* (2006.01)
*B29K 29/00* (2006.01)
*B29L 11/00* (2006.01)
*B29C 35/08* (2006.01)

(52) U.S. Cl.
CPC .. *B29C 2035/0838* (2013.01); *B29K 2029/04* (2013.01); *B29L 2011/00* (2013.01)

(58) Field of Classification Search
CPC .......... G02B 27/283; B29C 2035/0838; B29C 2035/0827; B29K 2029/04; B29L 2011/00
USPC ............ 359/486.01, 487.02, 489.01, 489.06, 359/494.01, 352; 349/96
See application file for complete search history.

(56) References Cited

U.S. PATENT DOCUMENTS

| | | | |
|---|---|---|---|
| 8,467,177 | B2 | 6/2013 | Mathew et al. |
| 2004/0001169 | A1 | 1/2004 | Saiki et al. |
| 2005/0140855 | A1 | 6/2005 | Utsumi et al. |
| 2008/0094544 | A1 | 4/2008 | Yaegashi et al. |
| 2008/0291377 | A1* | 11/2008 | Sekiguchi ......... G02F 1/133555 349/114 |
| 2011/0007248 | A1 | 1/2011 | Yonezawa et al. |
| 2012/0106063 | A1* | 5/2012 | Mathew ............ G02F 1/133528 361/679.21 |
| 2015/0153495 | A1* | 6/2015 | Matsuda .............. G02B 5/3016 349/194 |
| 2015/0301251 | A1* | 10/2015 | Hatanaka ........... B29D 11/0073 349/194 |

FOREIGN PATENT DOCUMENTS

| | | |
|---|---|---|
| JP | 54-032342 A | 3/1979 |
| JP | 60-427 A | 1/1985 |
| JP | 60-36563 B2 | 8/1985 |
| JP | 62-50802 A | 3/1987 |
| JP | 7-151913 A | 6/1995 |
| JP | 2003-307625 A | 10/2003 |
| JP | 2008-122921 A | 5/2008 |
| JP | 2009-217192 A | 9/2009 |
| JP | 2011-257479 A | 12/2011 |
| JP | 2012-137738 A | 7/2012 |
| JP | 2013-137551 A | 7/2013 |
| JP | 2013-167835 A | 8/2013 |
| JP | 2014-081482 A | 5/2014 |
| JP | 2014-164084 A | 9/2014 |
| JP | 2014-164085 A | 9/2014 |
| JP | 2014-191050 A | 10/2014 |
| KR | 10-2005-0067056 A | 6/2005 |
| KR | 10-2012-0046035 A | 5/2012 |
| TW | 445381 B | 7/2001 |
| TW | 201224716 A1 | 6/2012 |
| TW | 201339660 A | 10/2013 |
| WO | 2011-077742 A1 | 6/2011 |

* cited by examiner

POLARIZING PLATE HAVING LOCAL DEPOLARIZATION AREA AND METHOD FOR MANUFACTURING SAME

CROSS REFERENCE

This application is a National Stage Application of International Application No. PCT/KR2014/009053, filed Sep. 26, 2014, and claims priority to and the benefit of Korean Patent Application No. 10-2014-0126249, filed Sep. 23, 2014 and Korean Patent Application No. 10-2013-0117011, filed Sep. 30, 2013, the contents of which are incorporated by reference in their entirety for all purposes as if fully set forth below.

TECHNICAL FIELD

The present invention relates to a polarizing plate and a manufacturing method thereof, and more particularly, to a polarizing plate that locally has a depolarized region so as to be suitable for attachment to components such as a camera module, and to a manufacturing method thereof.

BACKGROUND ART

Polarizing plates have been applied to various image display devices such as liquid crystal display devices, organic light-emitting diodes and the like. A polarizing plate that is currently mainly used comprises a protective film laminated on one or both surfaces of a polyvinyl alcohol (hereinafter referred to as PVA) polarizer manufactured by dyeing a PVA-based film with iodine and/or a dichroic dye, crosslinking the iodine and/or dichroic dye with boric acid or the like, and aligning molecules in the film by stretching.

In recent years, the thickness of image display devices has been gradually reduced, and the thickness of the bezel and edge portions that do not display an image has been minimized in order to achieve a large screen size. In particular, various functions, including a camera and a video phone, are generally mounted in small and medium-sized display devices whose portability or mobility is emphasized, as well as notebook computers and personal computers (PCs). Specifically, components such as a camera are being mounted in image display devices. In addition, in terms of design factors, attempts have been made to impart various colors to product logos or bezel regions.

Meanwhile, conventional polarizing plates include an iodine and/or dichroic dye dyed throughout thereof, and thus show a deep black color, making it difficult to impart various colors to image display devices. In addition, when the polarizing plate is placed on a component such as a camera, there is a problem in that the polarizing plate absorbs 50% or more of the quantity of light, and thus the visibility of the camera lens is reduced.

To overcome this problem, during attachment of the polarizing plate, a physical removal method can be used in which a portion of the polarizing plate, which covers the camera lens, is removed by a process such as punching or cutting. Alternatively, a chemical removal method can also be used in which the polarizing plate portion that covers the camera lens is removed or bleached with a chemical substance such as an iodide ion.

However, the physical method as described above can impair the appearance of image display devices, and damage the polarizing plate due to the characteristic of the punching process. In addition, in the process of physically removing the polarizing plate portion as described above, a problem may arise in which the polarizing plate is torn. This problem is becoming more severe, due to a recent trend in which the thickness of polarizing plates has been gradually reduced. Meanwhile, in order to prevent damage (such as tearing) to polarizing plates, the punched portion of the polarizing plate should be formed sufficiently apart from the corners, and when this polarizing plate is applied to an image display device, there is a problem in that the bezel portion of the image display device becomes relatively wider so as to deviate from the recent narrow bezel design of image display devices. In addition, when a camera module is mounted in the punched portion of the polarizing plate as described above, there is a problem in that, because the camera lens is exposed to the outside of the image display device, the camera lens is likely to be contaminated and damaged when the image display device is used for a long period of time.

Meanwhile, the latter chemical removal method has problems in that it is difficult to accurately remove iodine from a desired portion of the polarizer, due to the diffusion of the chemical substance used, and thus it is difficult to control a depolarization region, and in that the chemical method is difficult to apply to a polarizing plate having a protective film bonded thereto.

Accordingly, there is a need for the development of a novel process that overcomes the above-described problems and that is used to locally form a depolarized or polarization-removed region in a polarizing plate so as to have a suitable size required.

DISCLOSURE

Technical Problem

The present invention has been made in order to solve the above-described problems, and it is an object of the present invention to provide a polarizing plate having a depolarized region in a portion thereof, and a manufacturing method thereof, which does not impair appearance and can achieve depolarization by a simple process without physical punching or the use of any chemical substance, unlike the prior art.

Technical Solution

In accordance with an embodiment of the present invention, there is provided a polarizing plate that comprises a polyvinyl alcohol-based polarizer dyed with any one or more of iodine and a dichroic dye and that locally has a depolarized region having a single transmittance of 70% or more at a wavelength ranging from 400 nm to 800 nm.

The depolarized region of the polarizing plate preferably has a degree of polarization of 20% or less, and a region of the polarizing plate, which excludes the depolarized region, preferably has a single transmittance of 40-45% and a degree of polarization of 99% or more.

In accordance with another embodiment of the present invention, there is provided an image display device comprising a display panel and a polarizing plate attached to one or both surfaces of the display panel, wherein the polarizing plate comprises a polyvinyl alcohol-based polarizer dyed with any one or more of iodine and a dichroic dye, and locally has a depolarized region having a single transmittance of 70% or more at a wavelength ranging from 400 nm to 800 nm.

In the image display device, a camera module may be located in the depolarized region.

In accordance with still another embodiment of the present invention, there is provided a method for manufacturing a polarizing plate, the method comprising a step of irradiating a portion of a polarizing element, which comprises a polyvinyl alcohol-based polarizer dyed with any one or more of iodine and a dichroic dye, with light having a specific wavelength selected from a wavelength range of 200 nm to 800 nm, to depolarize the portion.

In the method, the step of irradiating a portion of the polarizing element with light to depolarize the portion is preferably performed at an intensity of 0.1-20 W/cm$^2$ for 1-1000 seconds.

In addition, the step of irradiating a portion of the polarizing element with light to depolarize the region may be performed using a light-emitting diode (LED) lamp or a laser lamp.

Advantageous Effects

According to the manufacturing method of the present invention, a polarizing plate that locally has a depolarized region having a single transmittance of 70% or more at a wavelength ranging from 400 nm to 800 nm can be manufactured without physical or chemical damage by irradiating UV or visible light onto a portion of a polarizing ELEMENT comprising a polyvinyl alcohol-based polarizer dyed with any one or more of iodine and a dichroic dye.

BEST MODE

Hereinafter, exemplary embodiments of the present invention will be described. However, the present invention is not limited to the exemplary embodiments disclosed below and can be embodied in a variety of different forms. Moreover, these embodiments are provided so that this disclosure will be thorough and complete, and will fully convey the scope of the present invention to those skilled in the art.

The present inventors have found that, when a portion of a polarizing element comprising a polyvinyl alcohol-based polarizer dyed with iodine and/or a dichroic dye is irradiated with light having a specific wavelength selected from the UV or visible wavelength range, a polarizing plate that locally has a depolarized region having a single transmittance of 70% or more can be manufactured without using a punching or chemical method, thereby completing the present invention.

Figure 4:
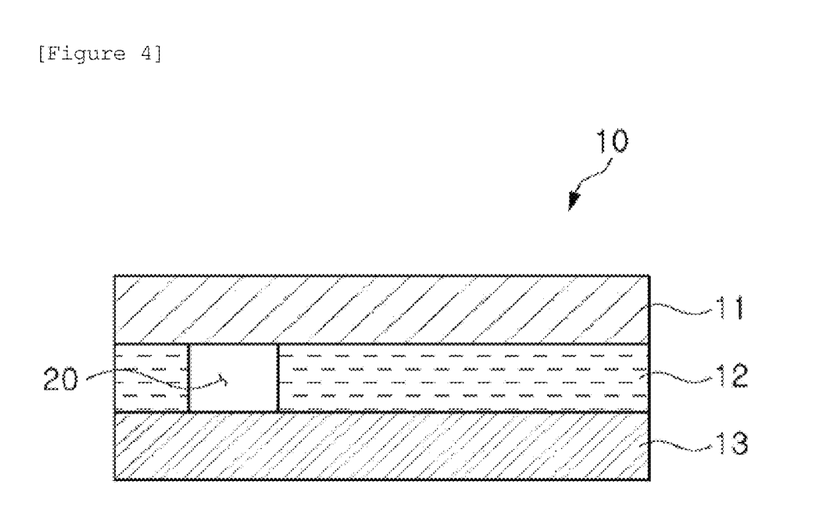
FIG. 4 depicts a polarizing plate according to an exemplary embodiment of the present specification.

The polarizing plate (10) according to the present invention is characterized in that it comprises a polyvinyl alcohol-based polarizer dyed with any one or more of iodine and a dichroic dye, and locally has a depolarized region (20) having a single transmittance of 70% or more at a wavelength ranging from 400 nm to 800 nm as can be seen from FIG. 4.

Meanwhile, the depolarized region of the polarizing plate refers to a region formed by a process of irradiating a portion of a polarizing element, which comprises a polyvinyl alcohol-based polarizer dyed with one or more of iodine and a dichroic dye, with light having a specific wavelength selected from a wavelength range of 200 nm to 800 nm, as explained below.

Herein, the depolarized region preferably has a single transmittance of 70% or more, and more preferably 80% or more, at a wavelength of 400-800 nm, which is in the visible wavelength range. In addition, the depolarized region preferably has a degree of polarization of 20% or less, and more preferably 15% or less. As the single transmittance increases and the degree of polarization decreases, the visibility of the depolarized region can be increased, and thus the performance and image quality of a camera lens to be located in the region can further be improved.

In the case of a conventional depolarization method that is performed by a physical methods such as punching or cutting, a portion of the aligned polarizer is completely removed, and thus polarization in the whole wavelength range, but the polarizing plate of the present invention has a characteristic difference from the conventional polarizing plate in that polarization mainly in the wavelength range from 400 nm to 800 nm is removed. This depolarized region is suitable for the present invention intended to improve the visibility of a region in which a camera module is to be located, while maintaining the characteristics of a polarizing plate. In addition, it can function to block light in the UV wavelength range, and thus can advantageously protect UV light-sensitive materials in camera modules or other application modules.

In addition, a region of the polarizing plate, which excludes the depolarized region, preferably has a single transmittance of 40-45%, and more preferably 42-45%. Further, the region excluding the depolarized region preferably has a degree of polarization of 99% or more. The region excluding the depolarized region preferably has excellent optical properties as described above, because it should function as a polarizing plate.

Meanwhile, the area of the depolarized region (20) may vary depending on the size of an image display device and/or the polarizing plate or on the size of a camera module and/or a product logo. More specifically, the area of the depolarized region (20) preferably accounts for 0.005-40% of the total area of the polarizing plate (10), but is not limited thereto.

In addition, the shape or position of the depolarized region is not specifically limited, and it may be formed in various shapes at various positions. For example, the depolarized region may be formed at a position at which a component such as a camera is to be mounted, so as to conform to the shape of the component. Alternatively, it may also be formed in a region in which a product log is to be printed, so as to conform to the shape of the product log. When a color is to be imparted to the bezel portion of the polarizing element, the depolarized region may be formed in a frame shape in the bezel portion of the polarizing element.

In the present invention, the depolarized region of the polarizing plate is produced by a step of irradiating a portion of a polarizing element, which comprises a polyvinyl alcohol-based polarizer dyed with one or more of iodine and a dichroic dye, with light having a specific wavelength selected from a wavelength range of 200 nm to 800 nm, to depolarize the portion. Hereinafter, a method for manufacturing the polarizing plate according to the present invention will be described.

The polarizing element that is used in the present invention may be either a polyvinyl alcohol-based polarizer dyed with iodine and/or a dichroic dye, manufactured as described above, or a polarizing plate comprising a protective film attached to at least one surface of the polarizer. Because the polarizer has a very thin thickness, a protective film (11, 13) is generally attached to one or both surfaces of the polarizer (12) to form a polarizing plate (10) in order to protect the polarizer (12) as shown in FIG. 4. As used herein, the term "protective film" refers to a transparent film that is attached to both surfaces of the polarizing element in order to protect the polarizer. The protective film may be an acetate-based resin film such as a triacetyl cellulose (TAC) film, a polyester-based resin film, a polyethersulfone-based resin film, a polycarbonate-based resin film, a polyamide-based resin film, a polyimide-based resin film, or a polyolefinic resin film, but is not limited thereto.

Herein, the protective film may be laminated using an adhesive. As the adhesive, a polyvinyl alcohol-based aqueous adhesive may be used, but is not limited thereto. In addition to the protective film, the polarizing plate may additionally comprise a functional film such as a wide-viewing angle compensating film or a brightness enhancing film in order to improve additional functions.

According to studies conducted by the present inventors, it was found that, when the step of selectively irradiating the polarizing element with UV or visible light as disclosed in the present invention is performed, problems of damage to the polarizing plate, contamination of a component, located below the depolarized region, and contamination of a logo, can be overcome, it is easy to control the depolarized region, and depolarization is achieved by a simple process, unlike a conventional physical removal methods such as punching or cutting, or a conventional chemical removal method that performs removal or bleaching using a chemical substance.

More specifically, it is known that a polarizing element comprising a polyvinyl alcohol-based polarizer dyed with iodine and/or a dichroic dye can absorb light in the UV or visible wavelength range, such as a wavelength ranging from 380 nm to 800 nm. Thus, when the polarizing element is irradiated with light having a wavelength selected from the above wavelength range, the irradiated light induces vibronic excitation of the iodine or dichroic dye, which is present in the polarizer and absorbs light in the above wavelength range. Due to the vibronic excitation of the dye molecules, the molecules of the iodine or dichroic dye are excited from an electronic ground state to an electronic excited state. Then, the iodine or dichroic dye in the electronic excited state is dissociated so that the chemical bond is broken, and thus the iodine or dichroic dye that absorbs light in the above wavelength range is decomposed into compounds that absorb light in a short-wavelength range (UV wavelength range), and for this reason, the polarizing function of the polarizing plate in the wavelength range of 380-800 nm that is in the visible wavelength range is removed so that the transmittance of the polarizing plate is increased.

More specifically, in the case of a polarizing plate dyed with iodine, the dyed iodine is present in various forms such as $KI_5$, $KI_3$, $I_2$ and KI. The iodine molecules absorb light in different wavelength ranges, and when these molecules are irradiated with light having a wavelength ranging from 200 nm to 800 nm, these molecules are decomposed into KI or I (single molecule) as shown in reaction equations 1 and 2 below. Because I absorbs light having a short wavelength of about 200 nm, the transmittance of light in the visible wavelength range increases when the decomposition of the iodine molecule as shown in the following reaction equations occurs.

Reaction Equation 1

Reaction Equation 2

In the irradiation step, UV or visible light having a specific wavelength selected from the wavelength range from 200 nm to 800 nm may be irradiated, and more preferably, light having a wavelength ranging from 400 nm to 750 nm may be irradiated. After transition of the iodine molecule to the electronic excited state, the chemical bond of the molecule is broken by a strong oscillating movement with heat, and for this reason, light in the wavelength range that can be absorbed by iodine may be irradiated. More preferably, the decomposition of the iodine molecule can easily occur in the wavelength range of 400-750 nm (having a higher extinction coefficient) in which a slightly larger quantity of light can be absorbed by iodine.

Moreover, the step of irradiating a portion of the polarizing element with light to depolarize the region is preferably performed at an intensity of 0.1-20 $W/cm^2$, and more preferably 1-5 $W/cm^2$. In this step, light may be irradiated for about 1-1000 seconds, and preferably about 10-250 seconds, depending on the irradiation intensity of the light.

More specifically, in the step of irradiating a portion of the polarizing element with light to depolarize the region, the irradiation intensity and time of light may vary depending on the kind of polarizing element. When a polarizer is irradiated with light, the light irradiation may be performed at an intensity of 0.1-1 $W/cm^2$ for 200-1000 seconds. More preferably, the light irradiation may be performed at an intensity of 0.5-0.8 $W/cm^2$ for 500-900 seconds. However, a polarizing plate is irradiated with light at an intensity of 0.5-20 $W/cm^2$ for 1-200 seconds, and more preferably at an intensity of 1-3 $W/cm^2$ for 5-30 seconds. In other words, because a polarizer has a strength lower than a polarizing plate, it is required to be irradiated with light at a lower laser intensity.

When light is irradiated under conditions that satisfy the above-described ranges, the single transmittance of the polarizing plate increases locally in the light-irradiated region, and the degree of polarization decreases locally in the irradiated region. In addition, in this case, the alignment of molecules in the polyvinyl alcohol-based film is not adversely affected, and twisting of the film by curing does not occur.

Figure 1:
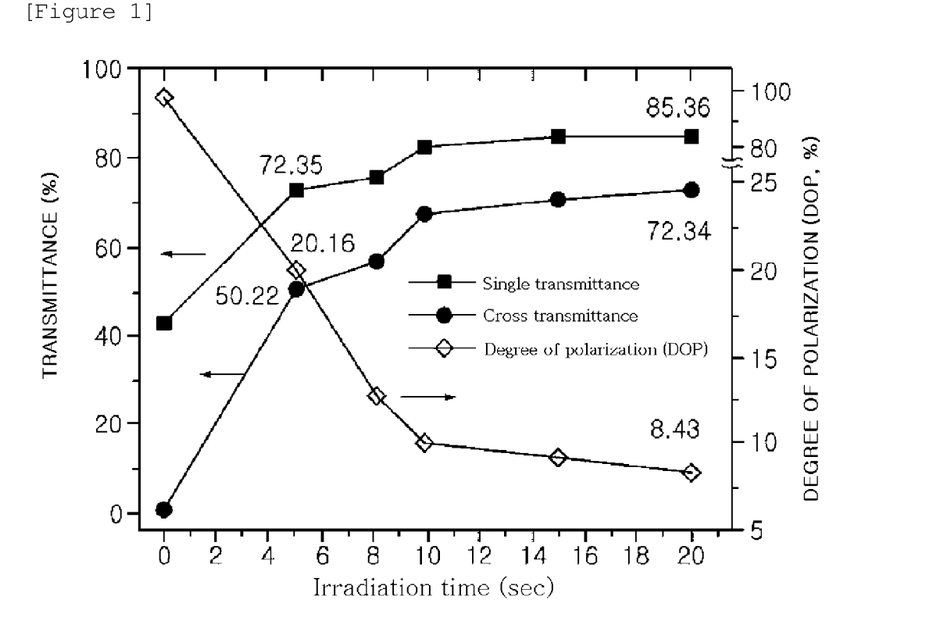
FIG. 1 depicts graphs showing the changes in single transmittance (Ts), cross transmittance (Tc) and degree of polarization (DOP) with a change in irradiation time for a polarizing plate irradiated with a laser having a wavelength of 532 nm at an intensity of 2 W/cm$^2$.

Meanwhile, FIG. 1 depicts graphs showing the changes in single transmittance (Ts), cross transmittance (Tc) and degree of polarization (DOP) with a change in irradiation time for a polarizing plate irradiated with a laser having a wavelength of 532 nm at an intensity of 2 $W/cm^2$. In FIG.

1, the x-axis shows the irradiation time, and the y-axis shows the single transmittance, the cross transmittance and the degree of polarization.

As can be seen from the graphs in FIG. 1, as the irradiation time increases, the transmittance increases, and the degree of polarization decreases.

Figure 2:
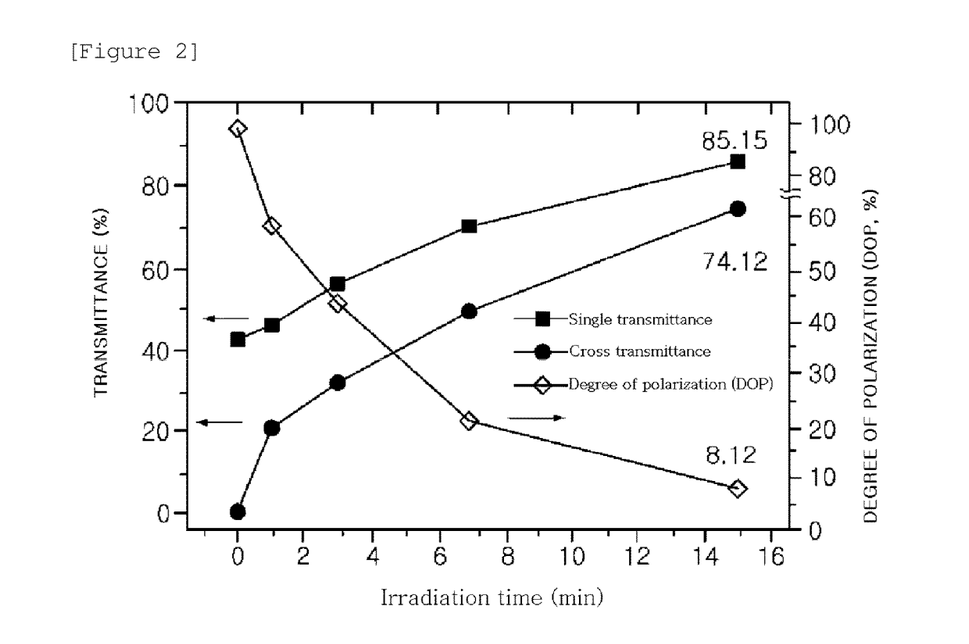
FIG. 2 depicts graphs showing the changes in single transmittance (Ts), cross transmittance (Tc) and degree of polarization (DOP) with a change in irradiation time for a polarizer irradiated with a laser having a wavelength of 266 nm at an intensity of 0.6 W/cm$^2$.

FIG. 2 shows the results obtained when a polarizer was irradiated with a laser having a wavelength of 266 nm at an intensity of 0.6 W/cm². Like the case of FIG. 1, it can be seen that, as the irradiation time increases, the transmittance increases, and the degree of polarization decreases.

Figure 5:
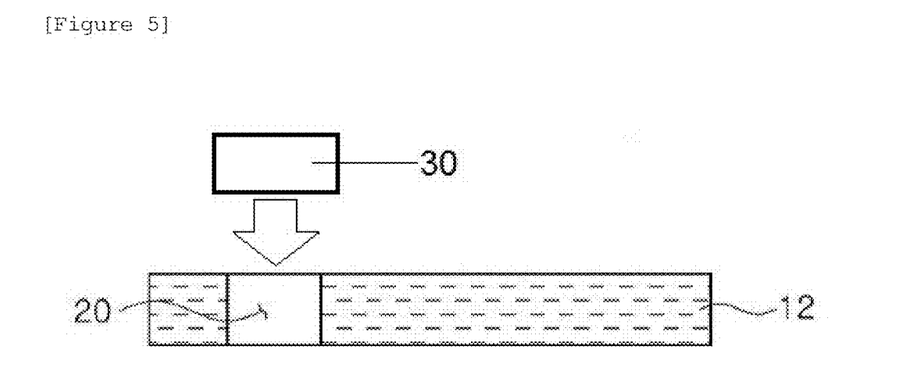
FIG. 5 depicts a step of irradiating a portion of the polarizing element with light to depolarize the portion, according to an exemplary embodiment of the present specification.

Meanwhile, as shown in FIG. 5. in the step of irradiating a portion of the polarizing element with light to depolarize the region (20), the polarizing element, that is, the polarizer (12) or the polarizing plate, may be irradiated with a laser using a masking process, a light-emitting diode (LED) lamp or a laser lamp. More preferably, the step is performed using a light source (30) including a light-emitting diode (LED) lamp or a laser lamp. When a light-emitting diode (LED) lamp or a laser lamp is used, light from the lamp can accurately target a desired local region due to its directionality to form a depolarized region, it is very easy to control the size of a depolarized region formed, and it is possible to form a depolarized region having a very fine size.

More specifically, when a light-emitting diode (LED) lamp or a laser lamp is used, it is preferred to control the polarization of light because of the characteristics of the polarizing plate having a light absorption axis and a light transmission axis. When the polarization direction of light is consistent with the direction of the absorption axis of the polarizing plate, a more effective increase in the transmittance and a more effective decrease in the degree of polarization can be observed, and the loss of the power that is consumed by the light source can also be prevented. If the polarization direction of light from the light source is consistent with the direction of the absorption axis of the polarizing plate, light from the light source may have any incident angle with respect to the polarizing plate.

However, if the polarization direction of light from the light source is not consistent with the direction of the absorption axis of the polarizing plate, the effect of the light on depolarization will significantly decrease. In the Examples of the present invention, light having a wavelength of 532 nm was irradiated using a Verdi laser (Coherent Inc.), and it was irradiated onto the polarizing plate using an optical lens at a distance of 40 cm forward from the focal spot. Also, polarized light from the light source was irradiated using a laser that predominantly emitted vertical polarized light at more than 100:1, and polarized light consistent with the absorption axis of the polarizing plate was irradiated at an angle of 5° or less. The light irradiation caused a local depolarized region having a diameter of 1 cm and increased transmittance.

Meanwhile, the polyvinyl alcohol-based polarizer dyed with the iodine and/or dichroic dye, which is used in the present invention, may be any polyvinyl alcohol-based polarizer well-known in the art. For example, it may be a polyvinyl alcohol-based polarizer manufactured by a method comprising the steps of: dyeing a polyvinyl alcohol-based film with iodine and/or a dichroic dye; crosslinking the polyvinyl alcohol-based film with the dye(s); and stretching the polyvinyl alcohol-based film.

Meanwhile, the dyeing step is performed to dye the polyvinyl alcohol-based film with an iodine molecule or dye. In this step, the iodine molecule or the dye molecule absorbs light oscillating in the stretching direction of the film, and allows light, which oscillates in the vertical direction, to pass therethrough, and thus polarized light having a specific oscillating direction can be obtained. Dyeing in this step may generally be performed by immersing the polyvinyl alcohol-based film in a treatment bath including a solution containing a dichroic material, such as an iodine solution.

A solvent that is used in the solution in the dyeing step is generally water, but it may contain a suitable amount of a water-compatible organic solvent. Meanwhile, the dichroic material such as iodine may be used in an amount of 0.06-0.25 parts by weight based on 100 parts by weight of the solvent. When the amount of dichroic material (such as iodine) used is within the above range, the transmittance of a polarizing element obtained after stretching can satisfy the range of 42.0-47.0%.

Meanwhile, when iodine is used as the dichroic material, the solution preferably additionally contains a dyeing assistant such as an iodine compound in order to improve the dyeing efficiency. The dyeing assistant may be used in an amount of 0.3-2.5 parts by weight based on 100 parts by weight of the solvent. The reason for the addition of the dyeing assistant such as an iodine compound is to increase the solubility of iodine in water, because iodine has low water solubility. Meanwhile, the mixing ratio between iodine and the iodine compound is preferably about 1:5 to 1:10.

Specific examples of an iodine compound that may additionally be used in the present invention include, but are not limited to, potassium iodide, lithium iodide, sodium iodide, zinc iodide, aluminum iodide, lead iodide, copper iodide, barium iodide, calcium iodide, tin iodide, titanium iodide, and mixtures thereof.

Meanwhile, the temperature of the treatment bath may be maintained at a temperature between about 25° C. and about 40° C. If the temperature of the treatment bath is lower than 25° C., the dyeing efficiency can decrease, and if the temperature of the treatment bath is higher than 40° C., a large amount of iodine can be sublimated, resulting in an increase in the amount of iodine used. In addition, the polyvinyl alcohol-based film may be immersed in the treatment bath for about 30-120 seconds. If the polyvinyl alcohol-based film is immersed for less than 30 seconds, uniform dyeing of the polyvinyl alcohol-based film cannot be achieved, and if the immersion time is more than 120 seconds, the dye will be saturated, and thus the film does not need to be immersed for 120 seconds.

The crosslinking step is generally performed using an immersion method in which the polyvinyl alcohol-based film is immersed in an aqueous boric acid solution or the like, but it may also be performed by an application or spray method in which a solution is sprayed onto the film.

When the crosslinking step is performed by, for example, the immersion method, after the polyvinyl alcohol-based film was dyed with an iodine molecule or a dichroic dye molecule in the dyeing step, the iodine molecule or the dichroic dye molecule is adsorbed onto a polymer matrix of the polyvinyl alcohol-based film using a crosslinking agent. This crosslinking step is performed by immersing the polyvinyl alcohol-based film in a crosslinking bath including a solution containing the crosslinking agent. This is because, if an iodine molecule is not properly adsorbed onto the polymer matrix, the polarizing plate cannot perform its function due to its low degree of polarization.

A solvent that is used in the solution of the crosslinking bath is generally water, but it may contain a suitable amount of a water-compatible organic solvent. The crosslinking agent may be added in an amount of 0.5-5.0 parts by weight based on 100 parts by weight of the solvent. If the crosslinking agent is added in an amount of less than 0.5 parts by weight, the degree of crosslinking in the polyvinyl alcohol-based film will be insufficient, and thus the strength of the polyvinyl alcohol-based film in water will be reduced, and if the crosslinking agent is added in an amount of more than 5.0 parts by weight, excessive crosslinking will occur, resulting in a decrease in the stretchability of the polyvinyl alcohol-based film.

In addition, specific examples of the crosslinking agent include, but are not limited to, boron compounds such as boric acid or borax, glyoxal, glutaraldehyde and the like, which may be used alone or in combination.

Meanwhile, the temperature of the crosslinking bath varies depending on the amount of the crosslinking agent and the stretching ratio of the film, and is preferably between 45° C. and 60° C., but is not limited thereto. Generally, as the amount of the crosslinking agent increases, the temperature of the crosslinking bath is controlled to a high temperature in order to increase the mobility of chains in the polyvinyl alcohol-based film, and as the amount of the crosslinking agent decreases, the temperature of the crosslinking bath is controlled to a low temperature. However, in the present invention, the temperature of the crosslinking bath should be maintained at 45° C. or higher in order to increase the stretchability of the polyvinyl alcohol-based film, because the film is at least 5-fold stretched.

Meanwhile, the time of immersion of the polyvinyl alcohol-based film in the crosslinking bath is preferably 30-120 seconds. If the immersion time is less than 30 seconds, uniform crosslinking in the polyvinyl alcohol-based film cannot be achieved, and if the immersion time is more than 120 seconds, crosslinking will be saturated, and thus the film does not need to be immersed for more than 120 seconds.

Meanwhile, "stretching" in the stretching step refers to uniaxially stretching a film in order to align the polymer molecules of the film in a specific direction. Stretching methods can be divided into wet stretching methods and dry stretching methods. The dry stretching methods are further divided into an inter-roll stretching method, a heating roll stretching method, a press stretching method, a tenter stretching method, etc., and the wet stretching methods are further divided into a tenter stretching method, an inter-roll stretching method, etc.

The stretching step is preferably performed by stretching the polyvinyl alcohol-based film at a ratio of 4:1 to 7:1 and at a temperature between 45° C. and 60° C. In order to impart polarizing performance to the polyvinyl alcohol-based film, chains in the polyvinyl alcohol-based film should be aligned. At a stretching ratio of less than 4:1, chains in the polyvinyl alcohol-based film cannot be sufficiently aligned, and at a stretching ratio of more than 7:1, chains in the polyvinyl alcohol-based film can be cleaved. In addition, the stretching temperature of the polyvinyl alcohol-based film may vary depending on the content of the crosslinking agent. At a temperature of less than 45° C., the mobility of chains in the polyvinyl alcohol-based film can be reduced, resulting in a decrease in the stretching efficiency, and at a temperature of more than 60° C., the polyvinyl alcohol-based film will become soft, and thus have reduced strength.

Meanwhile, the stretching step may be performed simultaneously with or separately from the dyeing step or the crosslinking step. If the stretching step is performed simultaneously with the dyeing step, the dyeing step is preferably performed in an iodine solution, and if the stretching step is performed simultaneously with the crosslinking step, the crosslinking step is preferably performed in an aqueous solution of boric acid.

Figure 6:
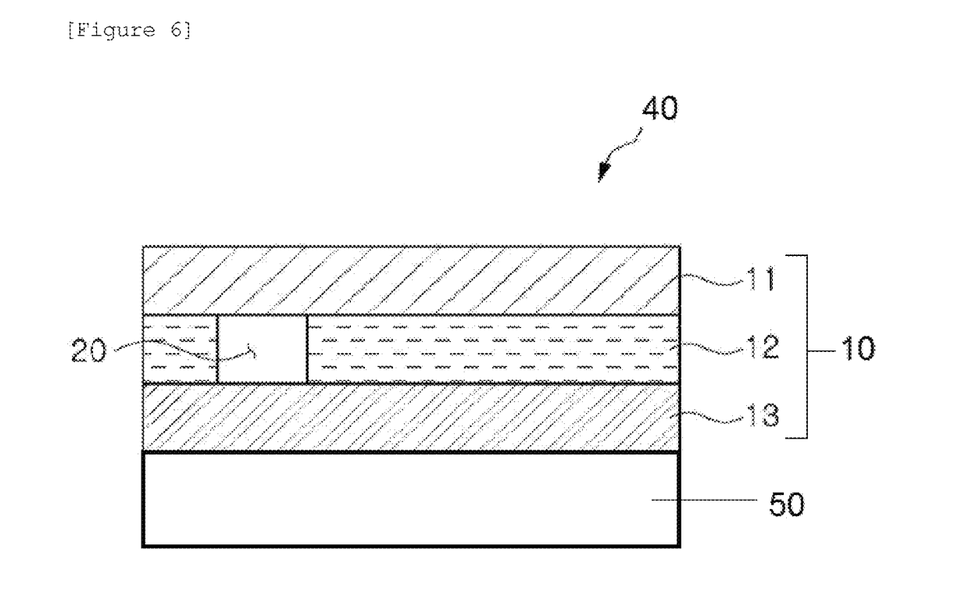
FIG. 6 depicts an image display device according to an exemplary embodiment of the present specification.

As shown in FIG. 6, the polarizing plate (10) of the present invention as described above can be advantageously applied to image display devices (40) by attaching it to one or both surfaces of display panels (50). The display panels may be a liquid crystal panel, a plasma panel and an organic light-emitting panel, and thus the image display device may be a liquid crystal display (LCD), a plasma display panel (PDP) and an organic light emitting diode (OLED).

More specifically, the image display device may be a liquid crystal display comprising: a liquid crystal panel, and polarizing plates provided on both surfaces of the liquid crystal panel, respectively, wherein at least one of the polarizing plates may be the polarizing plate of the present invention. In other words, the polarizing plate is characterized in that it comprises a polyvinyl alcohol-based polarizer dyed with any one or more of iodine and a dichroic dye, and locally has a depolarized region having a single transmittance of 70% or more.

Herein, the kind of liquid crystal panel that is included in the liquid crystal display is not specifically limited. Examples of the liquid crystal panel include, but are not limited to, all known panels, including passive matrix panels such as twisted nematic (TN) panels, super twisted nematic (STN) panels, ferroelectric (F) or polymer dispersed (PD) panels; active matrix panels such as two-terminal type panels or three-terminal type panels; in-plane switching (IPS) panels and vertical alignment (VA) panels, etc. In addition, the kinds of other components of the liquid crystal display, for example, upper and lower substrates (e.g., a color filter substrate or an array substrate), are not specifically limited, and those known in the art may be used without limitation.

Figure 7:
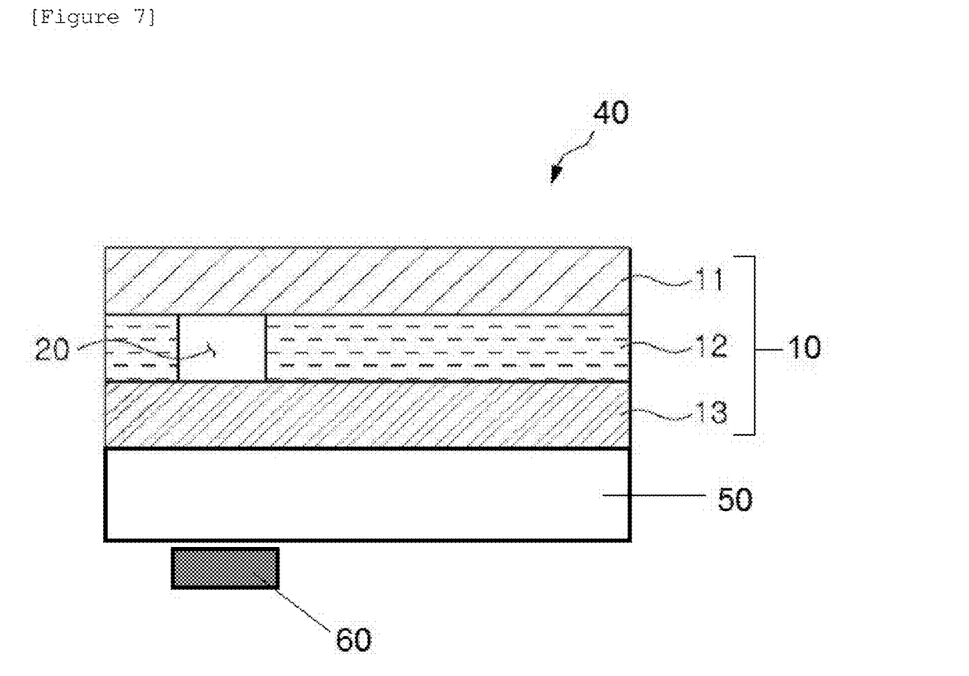
FIG. 7 depicts an image display device in which a camera module is located in the depolarized region of a polarizing plate.

Meanwhile, as shown in FIG. 7, the image display device (40) of the present invention may comprise, but is not limited to, other components such as a camera module (60), which may be located in the depolarized region (20). When a camera module is located in the depolarized region having an increased visible light transmittance and a reduced degree of polarization, the effect of increasing the visibility of the camera lens can be obtained.

MODE FOR INVENTION

Hereinafter, the present invention will be described in further detail with reference to examples. However, these examples are provided for a better understanding of the present invention and are not intended to limit the scope of the present invention.

Manufacturing Example 1

Manufacture of Polarizer

A polyvinyl alcohol-based film (Japanese Synthetic Rubber Co.; M3000 grade; 30 μm) was subjected to a swelling process in pure water at 25° C. for 15 seconds, and then subjected to a dyeing process in a 0.2 wt % iodine solution at 25° C. for 60 seconds. Next, the film was subjected to a cleaning process in a 1 wt % boric acid solution at 45° C. for 30 seconds, and then was 6-fold stretched in a 2.5 wt % boric acid solution at 52° C. After stretching, the film was subjected to a color complement process in a 5 wt % KI solution, and then dried in an oven at 60° C. for 5 minutes, thereby manufacturing a polarizer having a thickness of 12 μm.

Manufacturing Example 2

Manufacture of Polarizing Plate

A triacetyl cellulose (TAC) film having a thickness of 40 μm was placed and laminated on both surfaces of the PVA polarizer, manufactured in Manufacturing Example 1, using a PVA-based water soluble adhesive, and was then dried in an oven at 80° C. for 5 minutes, thereby manufacturing a polarizing plate having a structure of TAC/PVA/TAC.

Example 1

The polarizing plate manufactured in Manufacturing Example 2 was cut to a size of 60 mm×60 mm, and then irradiated with laser having a wavelength of 532 nm at an intensity of 2 W/cm$^2$ using a laser (Verdi, Coherent Inc.). FIG. 1 depicts graphs showing the single transmittance, cross transmittance and degree of polarization of the irradiated polarizing plate as a function of irradiation time.

Example 2

The polarizer manufactured in Manufacturing Example 1 was cut to a size of 60 mm×60 mm, and then irradiated with laser having a wavelength of 266 nm at an intensity of 0.6 W/cm$^2$ using a laser (Verdi 2V, MBD resonator, Coherent Inc.). FIG. 2 depicts graphs showing the single transmittance, cross transmittance and degree of polarization of the irradiated polarizer as a function of irradiation time.

Comparative Example 1

The polarizing plate manufactured in Manufacturing Example 2 was cut to a size of 60 mm×60 mm, and then irradiated with laser having a wavelength of 1070 nm at an intensity of 25 W/cm$^2$ using a laser. FIG. 1 depicts graphs showing the single transmittance, cross transmittance and degree of polarization of the irradiated polarizing plate as a function of irradiation time.

Test Example

Evaluation of Optical Properties

Each of the polarizing plates manufactured in Examples 1 and 2 and Comparative Example 1 was cut to a size of 40 mm×40 mm. Each of the cut samples was fixed to a measurement holder, and then measured for its initial optical properties, that is, single transmittance and degree of polarization, using a UV-Vis spectrophotometer (V-7100, JASCO Co., Ltd.).

As can be seen in FIGS. 1 and 2, as the irradiation time increased, the single transmittance (Ts) and the cross transmittance (Tc) increased, and the degree of polarization decreased. Particularly, in the case of FIG. 1, when the irradiation time was 8 seconds or more, the single transmittance (Ts) and the cross transmittance (Tc) were 70% or more and 50% or more, respectively, and the degree of polarization was 20% or less, suggesting that it is suitable for use as a depolarized region. In the case of FIG. 2, when the irradiation time was 400 seconds or more, the single transmittance (Ts) and the cross transmittance (Tc) were 70% or more and 50% or more, respectively, and the degree of polarization was 20% or less, suggesting that it is suitable for use as a depolarized region.

Figure 3:
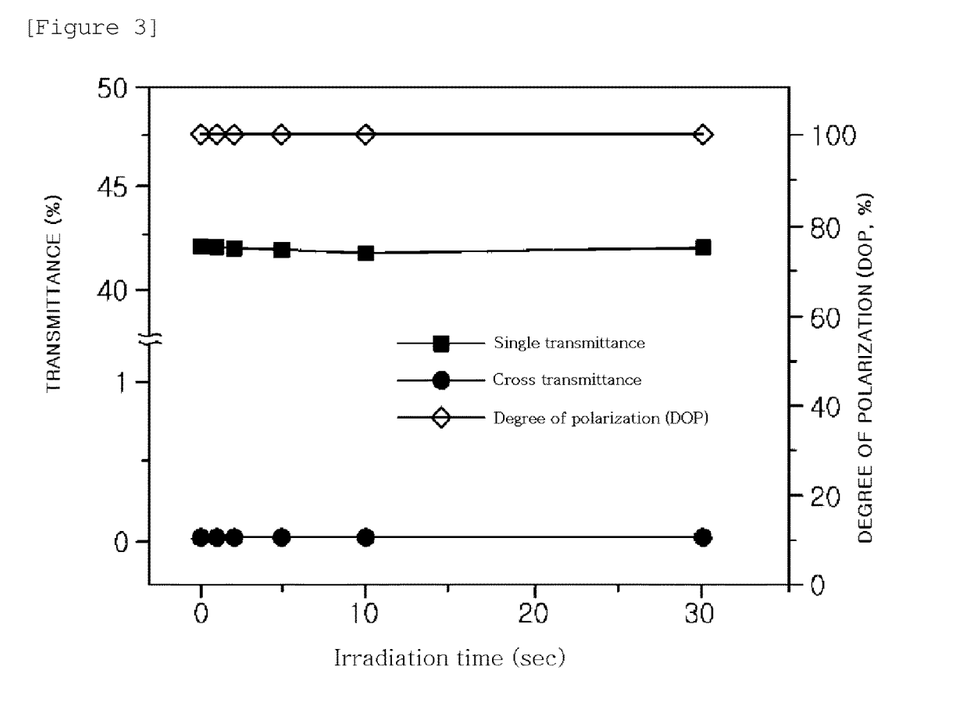
FIG. 3 depicts graphs showing the changes in single transmittance (Ts), cross transmittance (Tc) and degree of polarization (DOP) with a change in irradiation time for a polarizing plate irradiated with a laser having a wavelength of 1070 nm at an intensity of 25 W/cm$^2$.

On the other hand, in the case of FIG. 3, even when light having a wavelength of 1070 nm (that is in the infrared wavelength range) was irradiated, vibronic excitation of molecules constituting the polarizing plate could not occur, and thus it could be seen that the single transmittance (Ts), the cross transmittance (Tc) and the degree of polarization did not change even when the irradiation time increased.

Although the preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method for manufacturing a polarizing plate, the method comprising a step of irradiating a portion of a polarizing element, which comprises a polyvinyl alcohol-based polarizer dyed with any one or more of iodine and a dichroic dye, with light having a wavelength from 532 nm to 800 nm, to depolarize the portion to form a depolarized region,
  wherein the depolarized region of the polarizing plate has a degree of polarization of 20% or less,
  wherein a region of the polarizing plate, which excludes the depolarized region, has a single transmittance of 40%-45%, and a degree of polarization of 99% or more,
  wherein the step of irradiating a portion of the polarizing element with light to depolarize the portion is performed using a light-emitting diode (LED) lamp or a laser lamp at an intensity of 1W/cm$^2$-5W/cm$^2$ for 1-1,000 second, and
  wherein the light having a wavelength from 532 nm to 800 nm is a polarized light and irradiated such that an angle between a polarization direction of the polarized light and a light absorption axis of the polarizing plate is 5° or less.

2. The method of claim 1, wherein the depolarized region of the polarizing plate has a single transmittance of 70% or more at a wavelength ranging from 400 nm to 800 nm.

3. The method of claim 1, wherein an area of the depolarized region accounts for 0.005%-40% of a total area of the polarizing plate.

4. A method for manufacturing an image display device comprising a display panel and a polarizing plate attached to one or both surfaces of the display panel,
  the method comprising a step of irradiating a portion of a polarizing element, which comprises a polyvinyl alcohol-based polarizer dyed with any one or more of iodine and a dichroic dye, with light having a wavelength from 532 nm to 800 nm, to depolarize the portion to form a depolarized region,
  wherein the depolarized region of the polarizing plate has a degree of polarization of 20% or less,
  wherein a region of the polarizing plate, which excludes the depolarized region, has a single transmittance of 40%-45%, and a degree of polarization of 99% or more,
  wherein the step of irradiating a portion of the polarizing element with light to depolarize the portion is performed using a light-emitting diode (LED) lamp or a laser lamp at an intensity of 1W/cm$^2$-5W/cm$^2$ for 1-1,000 seconds, and wherein the light having a wavelength from 532 nm to 800 nm is a polarized light irradiated at an angle of 5° or less with respect to light absorption axis of the polarizing plate.

5. The image display device of claim 4, wherein a camera module is located in the depolarized region.

* * * * *